United States Patent
Patel et al.

(10) Patent No.: US 8,909,918 B2
(45) Date of Patent: Dec. 9, 2014

(54) TECHNIQUES TO CLASSIFY VIRTUAL PRIVATE NETWORK TRAFFIC BASED ON IDENTITY

(75) Inventors: Kunal Patel, Hayward, CA (US); Yixin Sun, San Ramon, CA (US); Puneet Gupta, Uttar Pradesh (IN); Vinod Arjun, Mountain View, CA (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 13/253,324

(22) Filed: Oct. 5, 2011

(65) Prior Publication Data

US 2013/0091352 A1    Apr. 11, 2013

(51) Int. Cl.
*H04L 29/06* (2006.01)
*H04L 9/32* (2006.01)

(52) U.S. Cl.
CPC .............. *H04L 9/321* (2013.01); *H04L 9/3263* (2013.01); *H04L 63/061* (2013.01); *H04L 63/164* (2013.01); *H04L 63/0428* (2013.01)
USPC .......................................... 713/156; 713/175

(58) Field of Classification Search
USPC ......... 713/150–153, 155–156, 168, 170–171, 713/175
See application file for complete search history.

(56) References Cited

U.S. PATENT DOCUMENTS

| | | | |
|---|---|---|---|
| 6,108,788 A * | 8/2000 | Moses et al. ................... | 713/155 |
| 6,202,157 B1 * | 3/2001 | Brownlie et al. ................. | 726/1 |
| 6,854,056 B1 * | 2/2005 | Benantar et al. .............. | 713/156 |
| 7,334,125 B1 * | 2/2008 | Pellacuru ....................... | 713/163 |
| 7,853,782 B1 * | 12/2010 | Geddes .......................... | 713/151 |
| 2002/0026427 A1 * | 2/2002 | Kon et al. ........................ | 705/67 |
| 2002/0116610 A1 * | 8/2002 | Holmes et al. ................ | 713/156 |
| 2002/0178355 A1 * | 11/2002 | D'Sa et al. .................... | 713/156 |
| 2003/0110374 A1 * | 6/2003 | Yamamoto et al. ........... | 713/155 |
| 2003/0204720 A1 * | 10/2003 | Schoen et al. ................ | 713/153 |
| 2003/0237004 A1 * | 12/2003 | Okamura ....................... | 713/201 |
| 2004/0039906 A1 * | 2/2004 | Oka et al. ....................... | 713/156 |
| 2004/0078573 A1 * | 4/2004 | Matsuyama ................... | 713/175 |
| 2005/0198306 A1 * | 9/2005 | Palojarvi et al. .............. | 709/227 |
| 2006/0048228 A1 * | 3/2006 | Takemori et al. .............. | 726/22 |
| 2007/0022477 A1 * | 1/2007 | Larson ............................ | 726/15 |
| 2008/0016335 A1 * | 1/2008 | Takahashi et al. ............ | 713/156 |
| 2009/0282242 A1 * | 11/2009 | Lortz ............................. | 713/157 |
| 2010/0228968 A1 * | 9/2010 | Wason et al. .................. | 713/156 |
| 2010/0306816 A1 | 12/2010 | McGrew et al. | |

* cited by examiner

*Primary Examiner* — Darren B Schwartz
(74) *Attorney, Agent, or Firm* — Edell, Shapiro & Finnan, LLC

(57) ABSTRACT

Techniques are provided for obtaining first and second digital certificates from a certificate authority database for establishing a secure exchange between network devices. The first digital certificate contains identity information of a first network device, and the second digital certificate contains classification information of the first network device. In one embodiment, a secure key exchange is initiated with the second network device, and the first and second digital certificates are transmitted as a part of the secure key exchange to the second network device. In another embodiment, the first and second digital certificates are received by an intermediate network device. The first digital certificate is encrypted and is not evaluated by the intermediate network device. The second digital certificate is evaluated for classification information of the first network device. Source information associated with the first network device is stored, and encrypted traffic is processed between the network devices.

20 Claims, 6 Drawing Sheets

US 8,909,918 B2

TECHNIQUES TO CLASSIFY VIRTUAL PRIVATE NETWORK TRAFFIC BASED ON IDENTITY

TECHNICAL FIELD

The present disclosure relates to establishing a secure exchange between network devices.

BACKGROUND

Prioritization and quality of services for encrypted traffic in an enterprise and service provider network is important to maintain efficient computing services. For example, in cloud computing or virtual desktop infrastructure environments, data and application services may need to be prioritized to maximize network operations. In such environments, when multiple applications are running simultaneously, different application services may require different levels of priority and quality of service.

DESCRIPTION OF EXAMPLE EMBODIMENTS

Overview

Techniques are provided for obtaining first and second digital certificates from a certificate authority database used for establishing a secure exchange between a first network device and a second network device. The first digital certificate contains identity information associated with the first network device, and the second digital certificate contains classification information associated with the first network device. In one embodiment, a secure key exchange is initiated with the second network device, and the first and second digital certificates are transmitted as a part of the secure key exchange to the second network device. In another embodiment, the first and second digital certificates are received by an intermediate network device, wherein the first digital certificate is encrypted such that the intermediate network device cannot evaluate the first digital certificate. The second digital certificate is evaluated by the intermediate network device to obtain classification information associated with the first network device. Source information associated with the first network device is stored, and encrypted traffic is processed between the first and second network devices.

EXAMPLE EMBODIMENTS

Figure 1:
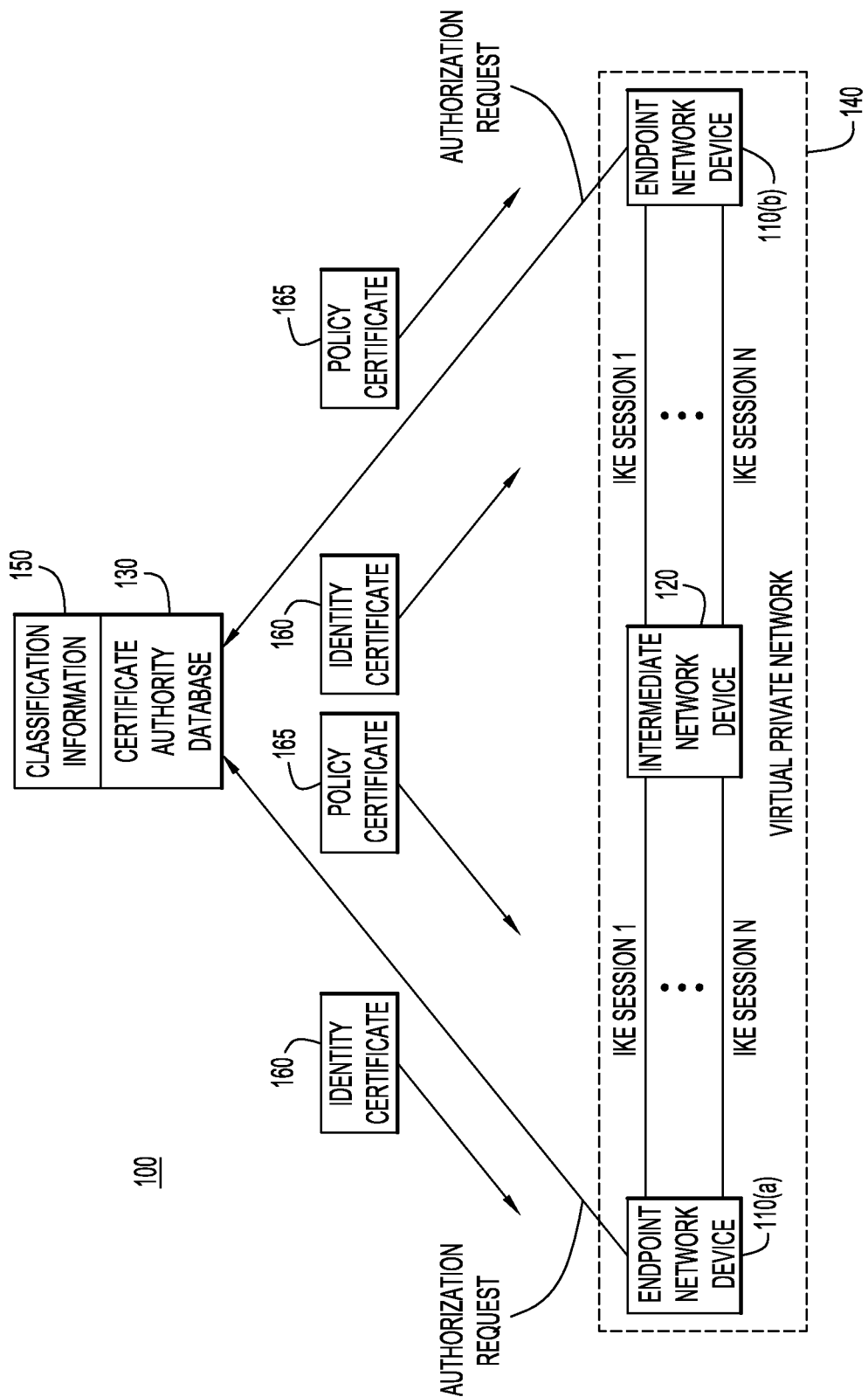
FIG. 1 is a block diagram of an example network topology that depicts a certificate authority database configured to provide endpoint network devices with identity and policy certificates to be used during secure exchange communications between the network devices.

FIG. 1 shows an example network topology 100 comprising a plurality of endpoint network devices 110(a) and 110(b), an intermediate network device 120 and a certificate authority database 130. The endpoint network devices 110(a) and 110(b) are configured to transmit and receive network data to and from the intermediate network device 120. In one example, endpoint network device 110(a) (referred to hereinafter as a "first endpoint network device") is configured to initiate a secure exchange communication to transmit encrypted network data destined for endpoint network device 110(b) (referred to hereinafter as a "second endpoint network device"). The intermediate device 120, residing between the first endpoint device 110(a) and the second endpoint device 110(b) intercepts the secure exchange communications and evaluates information contained within these communications to make policy decisions regarding messages exchanged between the first endpoint network device 110(a) and the second endpoint network device 110(b). Upon evaluating the secure exchange communications, the intermediate network device 120 forwards the communications (e.g., messages) to the second endpoint network device 110(b), as described herein. It should be appreciated that operations described herein as being performed by the first endpoint network device 110(a) may also be performed by the second endpoint network device 110(b), and vice versa.

The first and second endpoint network devices 110(a) and 110(b) and the intermediate network device 120 may optionally reside within a virtual private network (VPN) or remote access VPN (RAVPN), depicted at reference numeral 140. In one example, the first endpoint network device 110(a) exchanges encrypted messages as a part of the secure exchange communications with the intermediate device 120 and the second endpoint network device 110(b) within the VPN 140 in compliance with the Internet Protocol Security (IPSec) message exchange protocol to protect unauthorized viewing or modification of the exchange messages. For example, the first endpoint network device 110(a) may initiate a secure key exchange (e.g., a modified Internet Key Exchange (IKE)) to negotiate security parameters for messages exchanged with the second endpoint network device 110(b), in accordance with the IPSec protocol. In this example, the intermediate network device 120, by virtue of residing between the first endpoint network device 110(a) and the second endpoint network device 110(b) may be able to intercept the secure key exchange to classify the endpoint network devices 110(a) and 110(b) and to make policy decisions with respect to the secure key exchange messages exchanged between the endpoint network devices, as described herein.

The first endpoint network device 110(a) and the second endpoint network device 110(b) are also configured to communicate with the certificate authority database 130, for example, to obtain appropriate digital certificates (e.g., identity digital certificate 160 and policy digital certificate 165) to enable secure exchanges communications (e.g., the modified IKE exchange, described herein) between the endpoint network devices and the intermediate network device 120. The certificate authority database 130 is configured to store information related to each of the first endpoint network device 110(*a*), the second endpoint network device 110(*b*) and the intermediate network device 120.

The certificate authority database 130 may store identity information and classification information associated with network devices, an example of which is depicted in reference numeral 150. For example, the identity information stored in the certificate authority database 130 may comprise information that contains specific identification information that is particular and unique to each network device. In this example, the first endpoint network device 110(*a*), the second endpoint network device 110(*b*) and the intermediate network device 120 would be classified as unique devices, each having different identity information. The classification information stored in the certificate authority database 130 may comprise information that classifies a network device type as one of an endpoint network device, intermediate network device, or other network device. In this example, the first endpoint network device 110(*a*) and the second endpoint network device 110(*b*) would be classified as "endpoint network devices" and the intermediate network device 120 would be classified as an "intermediate network device." The certificate authority database 130 uses the identity information and classification information associated with each network device to generate and provide corresponding digital certificates, e.g., identity digital certificate 160 and classification or policy digital certificate 165 shown in FIG. 1, to corresponding network devices. These digital certificates may be used during secure exchange communications between the network devices to classify the message exchanged and to make policy decisions, as described herein.

In general, according to the techniques described herein, the first endpoint network device 110(*a*) may seek to initiate a secure exchange communication (e.g., a modified IKE exchange) with the second endpoint network device 110(*b*) in order to transmit encrypted messages. In order to do so, the first endpoint network device 110(*a*) needs to make certain that the other network devices (e.g., intermediate network device 120 and the second endpoint network device 110(*b*)) that will ultimately receive the encrypted messages are aware that the first endpoint network device 110(*a*) is an authenticated network device authorized to communicate with the other network devices. To accomplish this, the first endpoint network device 110(*a*) requests or queries the certificate authority database 130 to provide it with authorization and authentication information (e.g., digital certificates described above) that can be used by other network devices to verify the authenticity of the first endpoint network device 110(*a*). In response to the query, the certificate authority database 130 provides the first endpoint network device 110(*a*) with an appropriate identity digital certificate 160 and a policy digital certificate 165. These digital certificates can be used by, e.g., the intermediate network device 120, to classify and prioritize the messages exchanged between the first endpoint network device 110(*a*) and the second endpoint network device 110(*b*) during the secure exchange communication, as described in further detail below.

Figure 2:
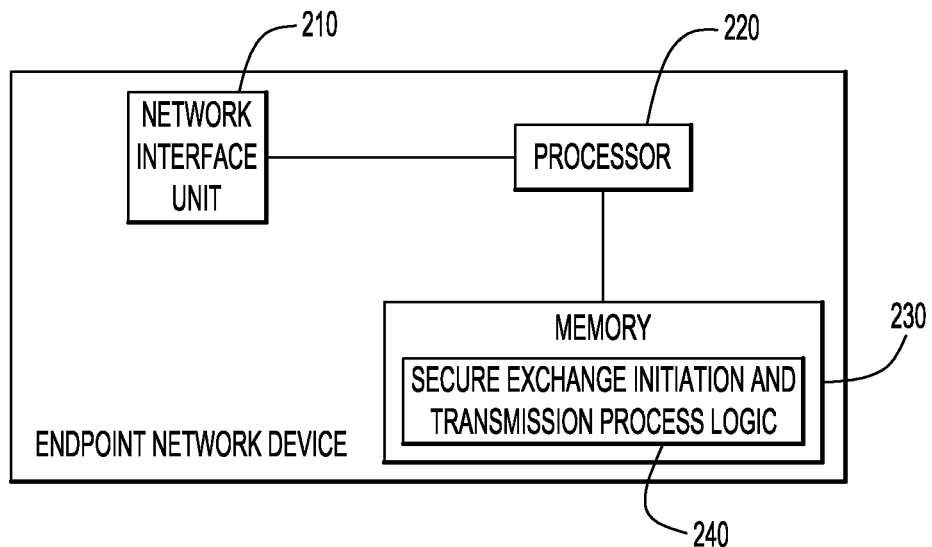
FIG. 2 is a block diagram of an example endpoint network device configured with secure exchange initiation and transmission process logic.

Turning to FIG. 2, an example block diagram depicting an endpoint network device is shown. The endpoint network device shown in FIG. 2 may be the first endpoint network device 110(*a*) or the second endpoint network device 110(*b*) depicted in FIG. 1, and it should be appreciated that FIG. 2 depicts endpoint network devices 110(*a*) and 110(*b*) generally. The endpoint network device 110(*a*)/110(*b*) comprises a network interface unit 210, a processor 220 and a memory 230. The network interface unit 210 is coupled to the processor 220 and is configured to transmit and receive messages over a network, e.g., to provide for encrypted network communications, as described herein. Additionally, the network interface unit 210 is configured to transmit query messages to the certificate authority database 130 for authorization and authentication information (digital certificates) and is configured to receive the digital certificates from the certificate authority database 130.

Processor 220 is coupled to the network interface unit 210 and to the memory 230. Processor 220 is a microprocessor or microcontroller, for example, that is configured to execute program logic instructions (i.e., software) for carrying out various operations and tasks described herein. For example, processor 220 is configured to execute secure exchange initiation and transmission process logic 240 that is stored in memory 230 to enable a secure exchange between the endpoint network devices and the intermediate network device 120. Memory 230 may comprise read only memory (ROM), random access memory (RAM), magnetic disk storage media devices, optical storage media devices, flash memory devices, electrical, optical or other physical/tangible memory storage devices.

The functions of processor 220 may be implemented by logic encoded in one or more tangible computer readable storage media (e.g., embedded logic such as an application specific integrated circuit, digital signal processor instructions, software that is executed by a processor, etc), wherein memory 230 stores data used for the operations described herein and stores software or processor executable instructions that are executed to carry out the operations described herein.

The secure exchange initiation and transmission process logic 240 may take any of a variety of forms, so as to be encoded in one or more tangible computer readable memory media or storage device for execution, such as fixed logic or programmable logic (e.g., software/computer instructions executed by a processor) and the processor 220 may be an application specific integrated circuit (ASIC) that comprises fixed digital logic, or a combination thereof. For example, the processor 220 may be embodied by digital logic gates in a fixed or programmable digital logic integrated circuit, which digital logic gates are configured to perform the secure exchange initiation and transmission logic 240. In general, the secure exchange initiation and transmission process logic 240 may be embodied in one or more computer readable storage media encoded with software comprising computer executable instructions and when the software is executed operable to perform the operations described herein for the process logic 240.

Figure 3:
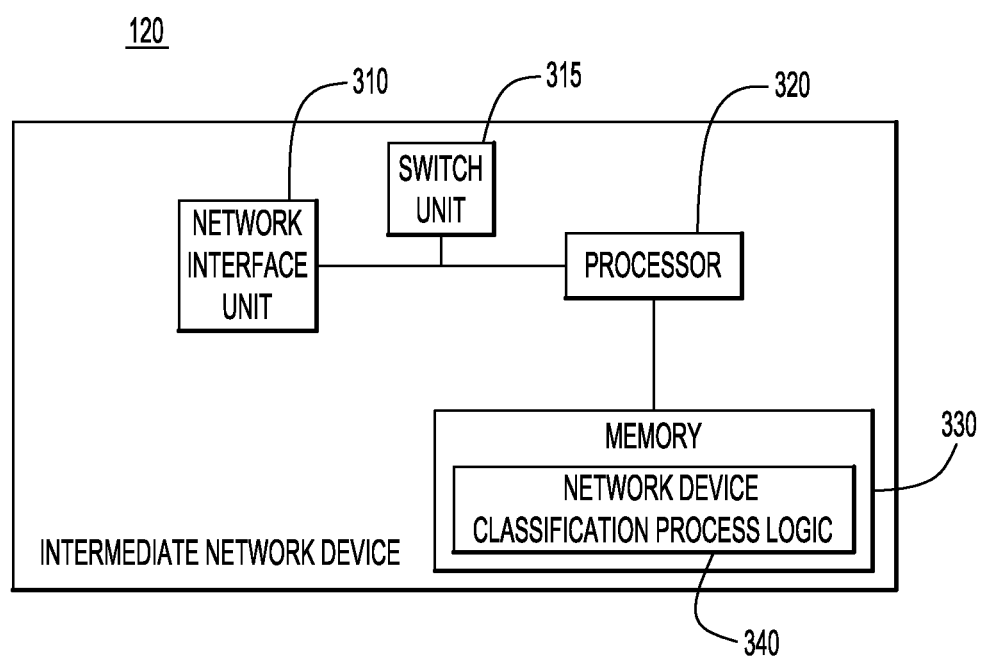
FIG. 3 is a block diagram of an example intermediate network device configured with network device classification process logic.

Reference is now made to FIG. 3. FIG. 3 shows an example block diagram of an intermediate network device 120. As stated above, in one example, the intermediate network device 120 resides between the first endpoint network device 110(*a*) and the second endpoint network device 110(*b*). The intermediate network device is configured with a network interface unit 310, a switch unit 315, a processor 320 and a memory 330. The network interface unit 310 is coupled to the switch unit 315 and is configured, for example, to transmit and receive communications over a network, e.g., secure exchange communications from the first endpoint network device 110(*a*) destined for the second endpoint network device 110(*b*) and to receive secure exchange communications from the second endpoint network device 110(*b*) destined for the first endpoint network device 110(*a*). Similarly, the network interface unit 310 is configured to transmit secure exchange communications received from the first endpoint network device 110(*a*) to the second endpoint network device 110(*b*) and vice versa.

The switch unit 315 is coupled to the processor 320 and is configured to enable the intermediate network device 120 to forward received secure exchange communications to the appropriate network endpoint device. For example, the switch unit 315 may forward the secure exchange communications received from the first endpoint network device 110(a) to the second endpoint network device 110(b) via the network interface unit 310. The processor 320 is coupled to the network interface unit 310, the switch unit 315 and to the memory 330. Processor 320 is a microprocessor or microcontroller that is configured to execute program logic instructions (i.e., software) for carrying out various operations and tasks described herein. For example, processor 320 is configured to execute network device classification process logic 340 that is stored in memory 330 to classify the network endpoint devices 110(a)/110(b) from which the secure message communications are received and to prioritize the transmission of these received messages. Memory 330 may comprise read ROM, RAM, magnetic disk storage media devices, optical storage media devices, flash memory devices, electrical, optical or other physical/tangible memory storage devices.

The processor 320 and the network device classification process logic 340 may take any of the variety of forms similar to those described above for processor 220 and process logic 240, respectively.

As stated above, the first endpoint network device 110(a) may initiate secure exchange communications with the second endpoint network device 110(b), and the intermediate network device 120, by virtue of residing between the first endpoint network device 110(a) and the second endpoint network device 110(b), can evaluate the communications to perform policy operations. In one example, the first endpoint network device 110(a) may initiate one or more modified IKE exchanges with the second endpoint network device 110(b), as shown in FIG. 1. In general, during traditional IKE message exchanges, packets containing identity information are exchanged between endpoint network devices to allow the network devices to identity themselves to one another. Typically, this identity information is provided in an identity certificate that is encrypted and unavailable to any intermediate network device residing between the endpoint network devices. Thus, the intermediate device cannot make any policy decisions (e.g., priority decisions, quality of service (QoS) decisions, access control lists, firewall decisions, etc.) based on the encrypted identity information.

The modified IKE message exchanges described herein alleviate this problem by including classification information in addition to the identity information available during the traditional IKE message exchanges. This classification information can be transmitted as a part of a policy certificate exchanged between the endpoint network devices (and the intermediate network device residing between the endpoint network devices).

Figure 4:
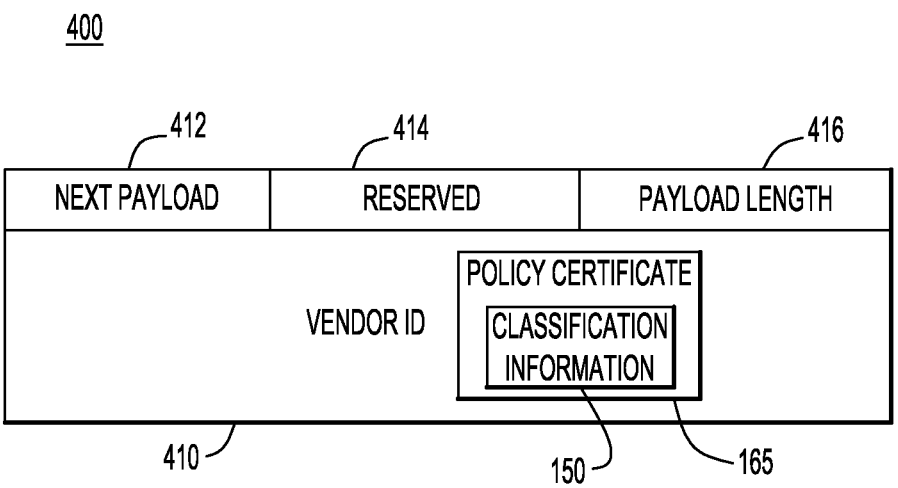
FIG. 4 is a diagram showing an example packet exchanged during the secure exchange communications between the endpoint network devices comprising a vendor identifier payload to identify network devices.

FIG. 4 shows an example packet 400 that is exchange between, e.g., the first endpoint network device 110(a), the intermediate device 120 and the second endpoint device 110(b) as a part of the modified IKE exchange. In FIG. 4, the classification information is included as the policy certificate 165 within a vendor identifier payload 410 of the packet 400. The packet 400 also has additional fields including a next payload field 412, reserved field 414 and payload length field 416.

The packet 400, and in particular, the classification information 150 in the policy certificate 165 can be utilized by the intermediate network device 120 to classify the endpoint network devices and to make the policy decisions based on the classification. For example, the classification information 150 may classify the first endpoint network device 110(a) as belonging to one of a predefined user group (e.g., a group of managers within an enterprise or company), a business unit group, an organization group unit, etc., that may be used by the intermediate device 120 to identify the first endpoint network device 110(a) to make appropriate policy decisions. The level of granularity of the classification information can be defined by an enterprise (of which the network devices belong) based on its own policy requirements. For example, the attributes of the classification information 150 of the policy certificate 165 can be determined or assigned based on the policy settings configured by a network administrator. The classification information 150, for example, can be exchanged between the endpoint network devices 110(a) and 110(b) as a part of message 1 and message 2 in an IKE version 1/version 2 exchange.

Figure 5:
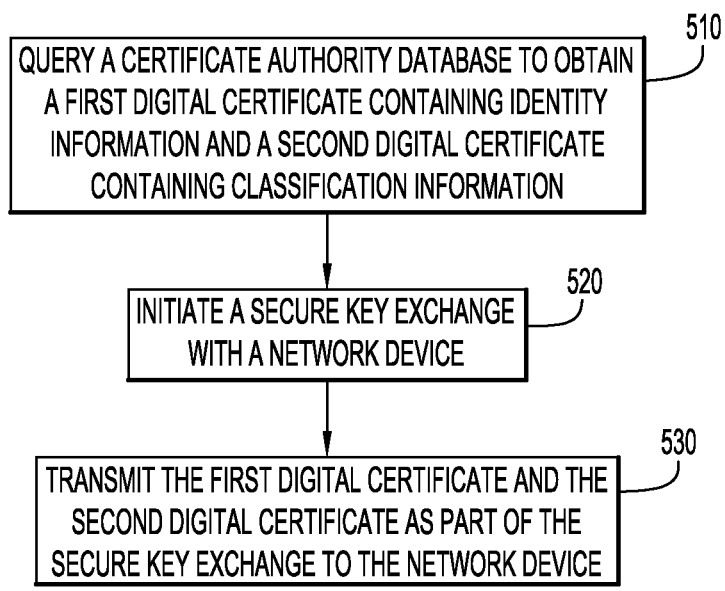
FIG. 5 is a flow chart depicting examples of operations of the secure exchange initiation and transmission process logic executed in the endpoint network devices configured to query a certificate authority database and to initiate a secure key exchange with other network devices.

Reference is now made to FIG. 5. FIG. 5 shows an example flow chart depicting operations of the secure exchange initiation and transmission process logic 240 executed in an endpoint network device. For simplicity, these operations are described as being performed by the first endpoint network device 110(a), though it should be appreciated that the second endpoint network device 110(b) can also perform these operations. At 510, the first endpoint network device 110(a) queries the certificate authority database 130 to obtain a first digital certificate and a second digital certificate. The first digital certificate, e.g., identity certificate 160, contains identity information of the first endpoint network device 110(a) stored in the certificate authority database 130. The second digital certificate, e.g., policy certificate 165, contains classification information to indicate that the first endpoint network device 110(a) is a particular type of endpoint network device (e.g., belonging to a user group, business unit, organization unit, etc., described above). For example, the classification information may be contained within a distinguished name associated with policy certificate 165. It should be appreciated that the first endpoint network device 110(a) can receive the policy certificate 165 via existing provisioning mechanisms (e.g., Secure Device Provisioning (SDP)). For example, the certificate authority database 130 can decide whether to generate the policy certificate 165 at the same time that it generates the identity certificate 160.

The first digital certificate and the second digital certificate are obtained in order to establish a secure exchange between a first network device (i.e., the first endpoint network device 110(a)) and a second network device (i.e., the second endpoint network device 110(b)). It should be appreciated that identity information contained within the policy certificate 165 does not expose the identity information contained in the identity certificate 160 during the secure exchange communication.

After querying the certificate authority database to obtain the first and second digital certificate, the first endpoint network device, at 520, initiates a secure key exchange with the second endpoint network device 110(b). As described above, the secure key exchange may be a part of secure exchange communications between the first endpoint network device 110(a) and the second endpoint network device 110(b). For example, the secure key exchange may be a modified IKE message exchange, as described above. At 530, the first endpoint network device 110(a) transmits the first digital certificate (e.g., identity certificate) and the second digital certificate (e.g., policy certificate) as a part of the secure key exchange destined for the second endpoint network device 110(b). In one example, the first endpoint network device 110(a) transmits the first digital certificate and the second digital certificate to allow the second endpoint network device 110(b) to process encrypted traffic between the first endpoint network device 110(a) and the second endpoint network device 110(b) in accordance with a secure exchange protocol (e.g., IPSec). In another example, the first endpoint network device 110(a) transmits the first and second digital certificate in an encrypted message to the second endpoint network device 110(b) in accordance with the secure exchange protocol.

Figure 6:
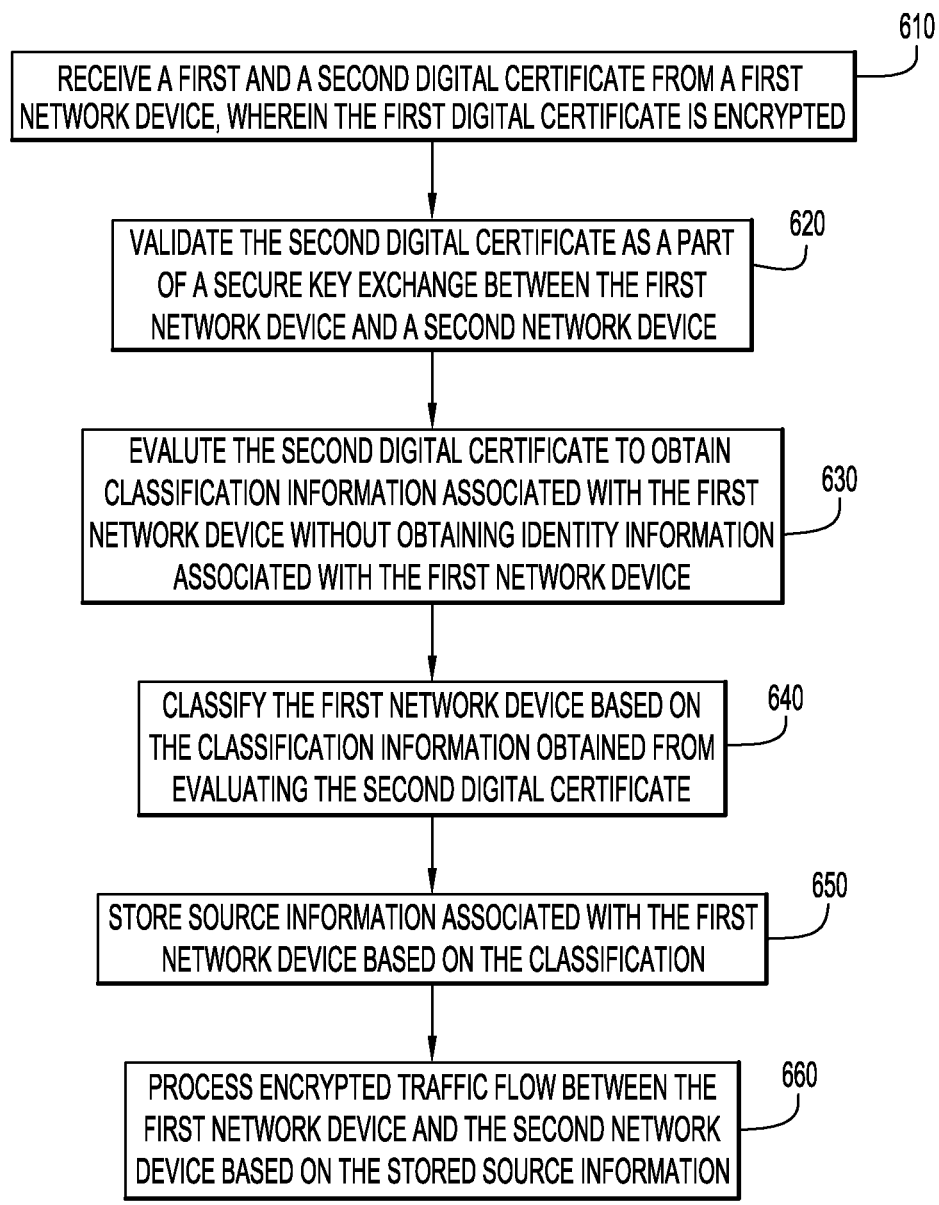
FIG. 6 is a flow chart depicting examples of operations of the network device classification process logic executed in the intermediate network device used to evaluate digital certificates exchanged between endpoint network devices to classify endpoint network devices.

Reference is now made to FIG. 6, which depicts a flow chart showing operations of the network device classification process logic 340 executed in the intermediate network device 120. At 610, the intermediate network device 120 receives the first digital certificate (e.g., identity certificate 160) and the second digital certificate (e.g., policy certificate 165) from the first endpoint network device 110(a). The first digital certificate received from the first endpoint network device 110(a) is encrypted in such a manner that the intermediate network device 120 cannot decrypt or read the identity certificate 160 to obtain, for example, identity information associated with the first endpoint network device 110(a). The intermediate network device 120, at 620, validates the second digital certificate as a part of the secure key exchange (e.g., modified IKE message exchange) between the first endpoint network device 110(a) and the second endpoint network device 110(b). At 630, the intermediate network device 120 evaluates the second digital certificate to obtain classification information associated with the first endpoint network device 110(a) without obtaining identity information associated with the first endpoint network device 110(a). Since the first digital certificate is encrypted, as described above, the intermediate network device 120 does not validate or evaluate the first digital certificate.

The intermediate network device 120, at 640, then classifies the first endpoint network device 110(a) based on the classification information obtained from evaluating the second digital certificate, and at 650, stores source information associated with the first network device based on the classification. For example, the intermediate network device 120 stores Internet Protocol (IP) address information, port number information, etc., associated with the first endpoint network device 110(a). In one example, the intermediate network device 120 classifies the stored information once security associations associated with an IPSec protocol are established. At 660, the intermediate network device 120 processes encrypted traffic flow (e.g., in accordance with the IPSec protocol) between the first endpoint network device 110(a) and the second endpoint network device 110(b) based on the stored source information.

It should be appreciated that during a modified IKE message exchange, each endpoint network device performs a sign operation to sign a defined number used once (nonce) with a private key associated with the policy certificate 165 assigned to the endpoint network device. During the message exchange, the nonce is sent along with the policy certificate from one endpoint network device to another endpoint network device according to, for example, public key cryptographic standard (PKCS) 7 within a vendor identifier payload (which is shown, for example, in FIG. 4). This signing operation is used to ensure that data is not tampered in transmission between the endpoint devices during the modified IKE exchange. Additionally, the signing operation decreases the window of time that an anti-replay attack from a malicious user can occur, since the nonce uses random data that consists of a time stamp. Additionally, the signing operation provides proof of possession by corresponding endpoint network devices of private keys corresponding to the policy certificate 165 that is sent as a part of PKCS 7.

The following provides an example of the packet exchange during the modified IKE message exchange. It should be appreciated that these techniques can be applied to modified IKEv1 and IKEv2 message exchanges.

| Initiator | Responder |
| --- | --- |
| HDR, SAi1, Kei, [PKCS#7], [CERTREQ] → | |
| | ← HDR, SAr1, Ker, Nr, [PKCS#7], [CERTREQ] |

When the initiator (e.g., the first endpoint network device 110(a)) initiates the security association (SA) of the modified IKE exchange, it sends the PKCS 7 certificate in the vendor ID payload (as shown in FIG. 4). For example, the PKCS 7 certificate may be a package that contains the policy certificate 165. PKCS 7 is used as an example herein, and it should be appreciated that any package that is capable of containing the policy certificate 165 (e.g., a cryptographic message syntax (CMS) package) may be used in place of PKCS 7. The intermediate network device 120 will validate the certificate chain and verify the signature. The intermediate network device 120 will then store this information locally and will wait for the response from the responder (e.g., the second endpoint network device 110(b)). The responder will also send its vendor ID payload. Once the intermediate network device 120 validates the responder, it can store information for the flow or source and can classify the source after the IPSec Security Associations (SAs) are established. This enables the intermediate network device 120 to provide policy services (e.g., QoS) based on the identity of encrypted traffic exchanged between the initiator and the responder, for example, in cloud computing services such as a Virtual Desktop Infrastructure (VDI) system.

In one example, the intermediate network device 120 may integrate these techniques on existing Public Key Infrastructure (PKI) or QoS infrastructure. For example, a user may be running one or more applications (e.g., video applications, voice applications, downloading operations, etc.) at the same time, and the user might require different levels of QoS. The techniques described herein can allow existing QoS capabilities of IP and IPSec to be combined to provide better granularity. The intermediate network device 120 can utilize the techniques described herein to make appropriate QoS decisions based on the availability of policy information associated with the endpoint network devices 110(a)-(b).

It should be appreciated that the techniques described above in connection with all embodiments may be performed by one or more computer readable storage media that is encoded with software comprising computer executable instructions to perform the methods and steps described herein.

In sum, a method is provided comprising: at a first network device, querying a certificate authority database to obtain a first digital certificate and a second digital certificate in order to establish a secure exchange between the first network device and a second network device, wherein the first digital certificate contains identity information associated with the first network device and the second digital certificate contains classification information associated with the first network device to indicate that the first network device is an endpoint network device; initiating a secure key exchange with the second network device; and transmitting the first digital certificate and the second digital certificate as a part of the secure key exchange to the second network device.

In addition, a method is provided comprising: at an intermediate network device configured to receive traffic sent in a network between at least first and second network devices, receiving a first digital certificate and a second digital certificate from the first network device, wherein the first digital certificate is encrypted such that the intermediate network device cannot evaluate the first digital certificate; evaluating the second digital certificate to obtain classification information associated with the first network device without obtaining identity information associated with the first network device; validating the second digital certificate as a part of a secure key exchange between the first network device and the second network device; classifying the first network device based on the classification information obtained from evaluating the second digital certificate; storing source information associated with the first network device based on the classification information; and processing encrypted traffic flow between the first network device and the second network device based on the stored source information.

Furthermore, an apparatus is provided comprising: a network interface unit configured to enable communications over a network; a memory; and a processor coupled to the network interface unit and the memory, and configured to: query, via the network interface unit, a certificate authority database to obtain a first digital certificate and a second digital certificate in order to establish a secure exchange between a first network device and a second network device, wherein the first digital certificate contains identity information associated with the first network device and the second digital certificate contains classification information associated with the first network device to indicate that the first network device is an endpoint network device; initiate a secure key exchange with the second network device; and transmit the first digital certificate and the second digital certificate as a part of the secure key exchange to the second network device.

Additionally, an apparatus is provided comprising: a network interface unit configured to enable communications over a network; a switch unit coupled to the network interface unit and configured to route packets in the network; a memory; and a processor coupled to the network interface unit, the switch unit and the memory, and configured to: receive, via the network interface unit, a first digital certificate and a second digital certificate from a first network device, wherein the first digital certificate is encrypted such that the processor cannot evaluate the first digital certificate; evaluate the second digital certificate to obtain classification information associated with the first network device without obtaining identity information associated with the first network device; validate the second digital certificate as a part of a secure key exchange between the first network device and a second network device; classify the first network device based on the classification information obtained from evaluating the second digital certificate; store source information associated with the first network device based on the classification; and process encrypted traffic flow between the first network device and the second network device based on the stored source information.

The above description is intended by way of example only. Various modifications and structural changes may be made therein without departing from the scope of the concepts described herein and within the scope and range of equivalents of the claims.

What is claimed is:

1. A method comprising:
    at a first network device, querying a certificate authority database to obtain a first digital certificate and a second digital certificate in order to establish a secure exchange between the first network device and a second network device, wherein the first digital certificate contains encrypted identity information associated with the first network device and the second digital certificate does not contain the encrypted identity information but contains unencrypted policy information including unencrypted classification information associated with the first network device to indicate that the first network device is an endpoint network device;
    initiating a secure key exchange with the second network device; and
    transmitting the first digital certificate and the second digital certificate as a part of the secure key exchange to the second network device such that the unencrypted policy information in the second digital certificate, but not the encrypted identity information in the first digital certificate, is available to an intermediate device.

2. The method of claim 1, wherein initiating comprises initiating a secure key exchange as a part of an Internet Key Exchange (IKE) protocol.

3. The method of claim 1, wherein querying comprises querying the certificate authority database to obtain the second digital certificate that contains the unencrypted classification information indicating that the first network device belongs to one of a plurality of predefined user groups.

4. The method of claim 1, wherein querying comprises querying the certificate authority database to obtain the second digital certificate that contains the unencrypted classification information indicating that the first network device belongs to a predefined user group comprising one of a business unit or organization unit.

5. The method of claim 1, wherein transmitting comprises transmitting the second digital certificate so that encrypted identity information of the first network device contained within the first digital certificate is not exposed by the unencrypted classification information contained in the second digital certificate.

6. The method of claim 1, wherein querying comprises querying the certificate authority database to obtain the second digital certificate from the certification authority database based on policy settings configured by a network administrator.

7. The method of claim 1, wherein transmitting comprises transmitting the first digital certificate and the second digital certificate to allow the second network device to process encrypted traffic between the first network device and the second network device in accordance with a secure exchange protocol.

8. The method of claim 1, wherein transmitting comprises transmitting the second digital certificate in an encrypted message to the second network device in accordance with a secure exchange protocol.

9. A method comprising:
    at an intermediate network device configured to receive traffic sent in a network between at least first and second network devices, receiving a first digital certificate and a second digital certificate from the first network device, wherein the first digital certificate contains encrypted identity information associated with the first network device and is encrypted such that the intermediate network device cannot evaluate the first digital certificate and wherein the second digital certificate does not contain the encrypted identity information but contains unencrypted policy information including unencrypted classification information associated with the first network device;
    validating the second digital certificate as a part of a secure key exchange between the first network device and the second network device;

evaluating the second digital certificate to obtain the unencrypted classification information associated with the first network device without obtaining the encrypted identity information associated with the first network device;
classifying the first network device based on the unencrypted classification information obtained from evaluating the second digital certificate;
storing source information associated with the first network device based on the unencrypted classification information; and
processing encrypted traffic flow between the first network device and the second network device based on the stored source information.

10. The method of claim 9, wherein classifying the first network device comprises classifying the first network device based on user group information indicated by the unencrypted classification information contained within the second digital certificate associated with the first network device.

11. The method of claim 10, wherein classifying comprises classifying the first network device as an endpoint network device.

12. The method of claim 9, wherein storing source information comprises storing Internet Protocol (IP) address information and port information associated with the first network device.

13. The method of claim 9, wherein validating comprises validating the second digital certificate in accordance with an Internet Key Exchange (IKE) protocol.

14. An apparatus comprising:
a network interface unit configured to enable communications over a network;
a memory; and
a processor coupled to the network interface unit and the memory, and configured to:
query, via the network interface unit, a certificate authority database to obtain a first digital certificate and a second digital certificate in order to establish a secure exchange between a first network device and a second network device, wherein the first digital certificate contains encrypted identity information associated with the first network device and the second digital certificate does not contain the encrypted identity information but contains unencrypted policy information including unencrypted classification information associated with the first network device to indicate that the first network device is an endpoint network device;
initiate a secure key exchange with the second network device; and
transmit the first digital certificate and the second digital certificate as a part of the secure key exchange to the second network device such that the unencrypted policy information in the second digital certificate, but not the encrypted identity information in the first digital certificate, is available to an intermediate device.

15. The apparatus of claim 14, wherein the processor is further configured to initiate the secure key exchange as a part of an Internet Key Exchange (IKE) protocol.

16. The apparatus of claim 14, wherein the processor is further configured to query the certificate authority database to obtain the second digital certificate that contains the unencrypted classification information indicating that the first network device belongs to one of a plurality of predefined user groups.

17. An apparatus comprising:
a network interface unit configured to enable communications over a network;
a switch unit coupled to the network interface unit and configured to route packets in the network;
a memory; and
a processor coupled to the network interface unit, the switch unit and the memory, and configured to:
receive, via the network interface unit, a first digital certificate and a second digital certificate from a first network device, wherein the first digital certificate contains encrypted identity information associated with the first network device and is encrypted such that the processor cannot evaluate the first digital certificate and wherein the second digital certificate does not contain the encrypted identity information but contains unencrypted policy information including unencrypted classification information associated with the first network device;
validate the second digital certificate as a part of a secure key exchange between the first network device and a second network device;
evaluate the second digital certificate to obtain the unencrypted classification information associated with the first network device without obtaining the encrypted identity information associated with the first network device;
classify the first network device based on the unencrypted classification information obtained from evaluating the second digital certificate;
store source information associated with the first network device based on the unencrypted classification information; and
process encrypted traffic flow between the first network device and the second network device based on the stored source information.

18. The apparatus of claim 17, wherein the processor is further configured to classify the first network device based on user group information indicated by the unencrypted classification information contained within the second digital certificate associated with the first network device.

19. The apparatus of claim 17, wherein the processor is further configured to store source information comprising Internet Protocol (IP) address information and port information associated with the first network device.

20. The apparatus of claim 17, wherein the processor is further configured to validate the second digital certificate in accordance with an Internet Key Exchange (IKE) protocol.

* * * * *